(12) United States Patent
Biset et al.

(10) Patent No.: US 10,184,398 B2
(45) Date of Patent: Jan. 22, 2019

(54) ACOUSTIC STRUCTURAL PANEL WITH SLANTED CORE

(71) Applicant: ROHR, INC., Chula Vista, CA (US)

(72) Inventors: Charles Michael Biset, San Diego, CA (US); Song Chiou, Cerritos, CA (US); Claude Hubert, Riverside, CA (US); Michael Layland, Bonita, CA (US); Christian Soria, La Mesa, CA (US)

(73) Assignee: ROHR, INC., Chula Vista, CA (US)

( * ) Notice: Subject to any disclaimer, the term of this patent is extended or adjusted under 35 U.S.C. 154(b) by 1145 days.

(21) Appl. No.: 14/056,815

(22) Filed: Oct. 17, 2013

(65) Prior Publication Data

US 2015/0110603 A1 Apr. 23, 2015

(51) Int. Cl.
*F02C 7/045* (2006.01)

(52) U.S. Cl.
CPC ........ *F02C 7/045* (2013.01); *F05D 2250/283* (2013.01); *F05D 2260/96* (2013.01); *Y02T 50/672* (2013.01)

(58) Field of Classification Search
CPC ............... F02C 7/045; F05D 2250/283; F05D 2260/96; Y02T 50/672
See application file for complete search history.

(56) References Cited

U.S. PATENT DOCUMENTS

| | | | |
|---|---|---|---|
| 2,682,235 A | * | 6/1954 | Fuller ................ E04B 1/19 343/872 |
| 3,734,234 A | | 5/1973 | Wirt |
| 3,821,999 A | | 7/1974 | Guess et al. |
| 3,913,702 A | | 10/1975 | Wirt et al. |
| 4,257,998 A | | 3/1981 | Diepenbrock, Jr. et al. |

(Continued)

FOREIGN PATENT DOCUMENTS

| | | |
|---|---|---|
| CN | 1261422 | 7/2000 |
| CN | 101652809 | 2/2010 |

(Continued)

OTHER PUBLICATIONS

First Office Action dated Nov. 1, 2016 in Chinese Application No. 201410516358.X.

(Continued)

*Primary Examiner* — Carlos A Rivera
*Assistant Examiner* — Justin A Pruitt
(74) *Attorney, Agent, or Firm* — Snell & Wilmer, L.L.P.

(57) ABSTRACT

A nacelle may comprise a noise suppressing structure. The noise suppressing structure may comprise a plurality of noise suppressing cells situated between a perforated layer of material and a non-perforated layer of material. The plurality of noise suppressing cells may contact the perforated layer of material and the non-perforated layer of material at an acute angle (e.g., between twenty and seventy-five degrees) such that the plurality of noise suppressing cells are non-orthogonal to the perforated layer of material and the non-perforated layer of material. Further, each of the plurality of noise suppressing cells may comprise a hexagonal cross-sectional profile. Further still, the noise suppressing structure may comprise a support structure comprising a plurality of support members, wherein the plurality of noise suppressing cells are situated within the support structure.

15 Claims, 7 Drawing Sheets

(56) References Cited

U.S. PATENT DOCUMENTS

| | | | |
|---|---|---|---|
| 5,923,003 A | 7/1999 | Arcas et al. | |
| 8,579,076 B2 * | 11/2013 | Ayle | F02C 7/045 |
| | | | 181/210 |
| 2013/0251510 A1 | 9/2013 | Runyan | |
| 2014/0077031 A1 * | 3/2014 | Benedetti | B32B 15/01 |
| | | | 244/1 N |
| 2014/0090923 A1 * | 4/2014 | Murray | F02K 3/06 |
| | | | 181/222 |
| 2015/0110603 A1 | 4/2015 | Biset et al. | |

FOREIGN PATENT DOCUMENTS

| | | |
|---|---|---|
| CN | 102686481 | 9/2012 |
| CN | 202789033 | 3/2013 |
| EP | 0911803 | 4/1999 |
| GB | 2252075 | 7/1992 |

OTHER PUBLICATIONS

Second Office Action dated Jul. 4, 2017 in Chinese Application No. 201410516358.X.

Third Office Action dated Jan. 3, 2018 in Chinese Application No. 201410516358.X.

* cited by examiner

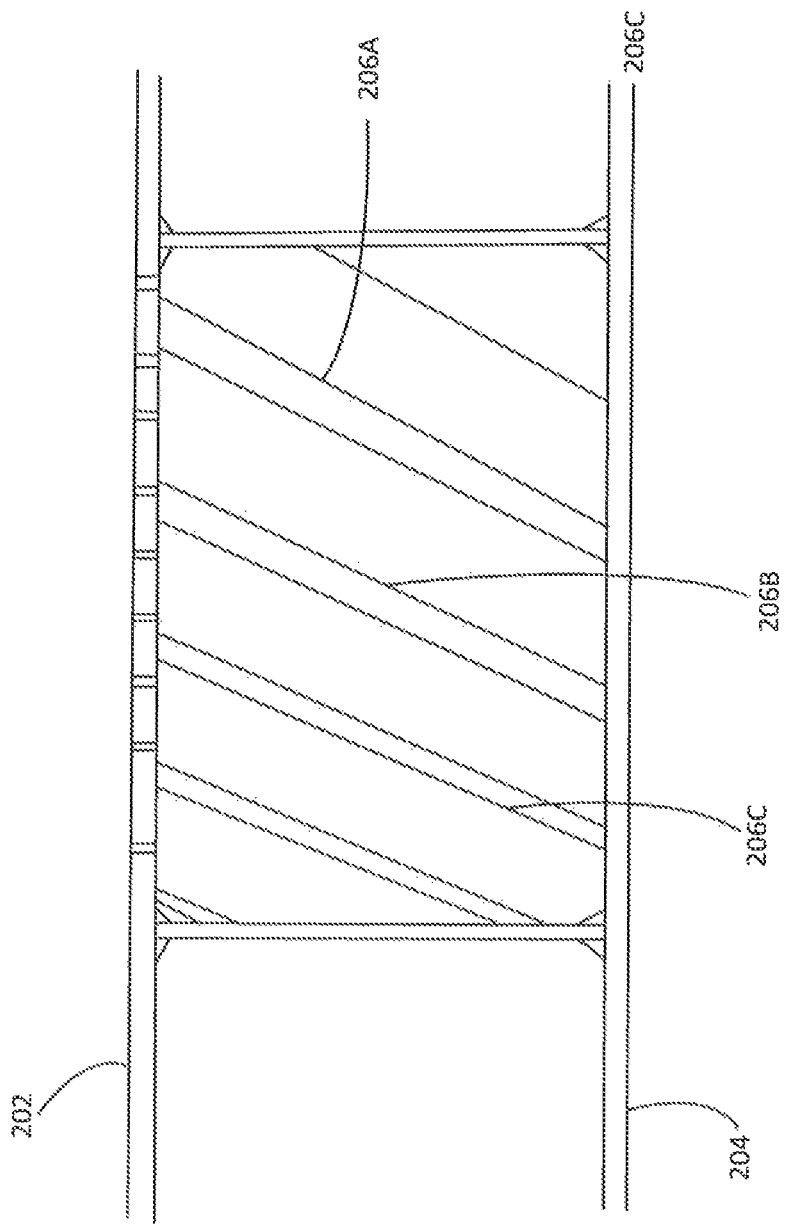

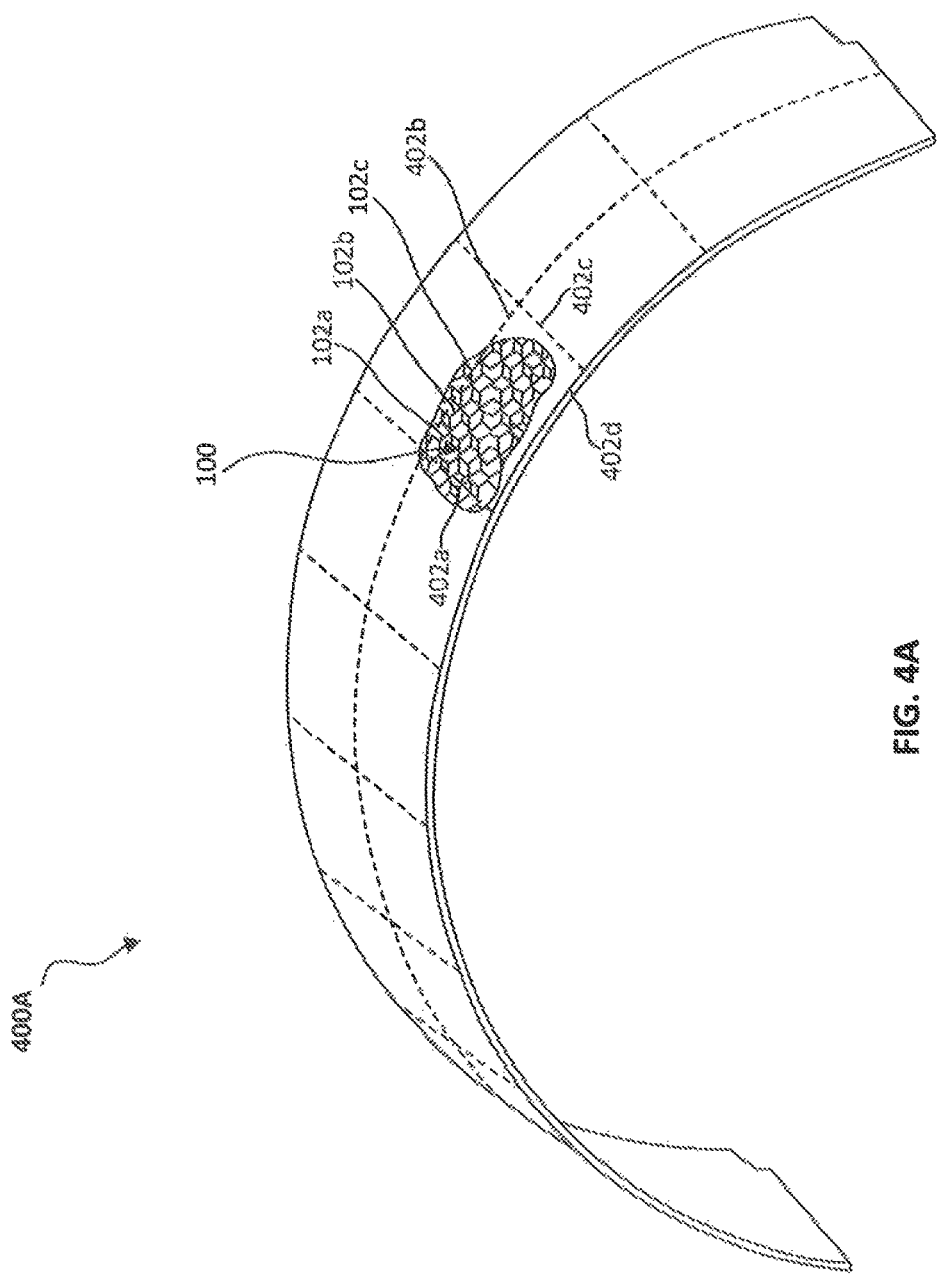

ACOUSTIC STRUCTURAL PANEL WITH SLANTED CORE

FIELD

The present disclosure relates to gas engine turbines, and more particularly, to a noise suppression system for gas turbine engines.

BACKGROUND

Gas turbine engines, such as those that power modern commercial aircraft, typically include noise suppressing structures. These structures are typically comprised of a plurality of cellular structures or cells. These cells are often arranged in a lattice, such as a lattice resembling a plurality of "honeycomb" shaped cells.

SUMMARY

In various embodiments, an aircraft nacelle may comprise a noise suppressing structure. The noise suppressing structure may comprise a plurality of noise suppressing cells situated between a perforated layer of material and a non-perforated layer of material. The plurality of noise suppressing cells may contact the perforated layer of material and the non-perforated layer of material at an acute angle (e.g., between twenty and seven-five degrees from the horizontal) such that the plurality of noise suppressing cells are non-orthogonal to the perforated layer of material and the non-perforated layer of material. Further, in various embodiments, each of the plurality of noise suppressing cells may comprise a hexagonal cross-sectional profile. Further still, in various embodiments, the noise suppressing structure may comprise a support structure comprising a plurality of support members, wherein the plurality of noise suppressing cells are situated within the support structure. The noise suppressing structure may comprise any of (and/or any combination of) a quadrilateral geometry, a trilateral geometry, a hexagonal geometry, and the like. In various embodiments, a wall of each of the plurality of noise suppressing cells defines a cell depth.

In various embodiments, a nacelle for a jet engine may comprise a plurality of noise suppressing cells situated within a support structure defined by a plurality of intersecting support members. The noise suppressing cells may extend non-orthogonally to a perforated layer of material, and may be situated between the perforated layer of material and a non-perforated layer of material. In addition, the plurality of noise suppressing cells may contact the perforated layer of material at an acute angle such that the plurality of noise suppressing cells are non-orthogonal to the perforated layer of material. The support structure may comprise any of (and/or any combination of) a quadrilateral geometry, a trilateral geometry, a hexagonal geometry, and the like. In various embodiments, each of the plurality of noise suppressing cells may define a cell depth.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

FIG. 3B illustrates, in accordance with various embodiments, a cross-sectional view of a plurality of noise suppressing cells.

FIG. 4A illustrates, in accordance with various embodiments, a perspective view of a nacelle comprising a quadrilateral support structure.

DETAILED DESCRIPTION

Figure 1:
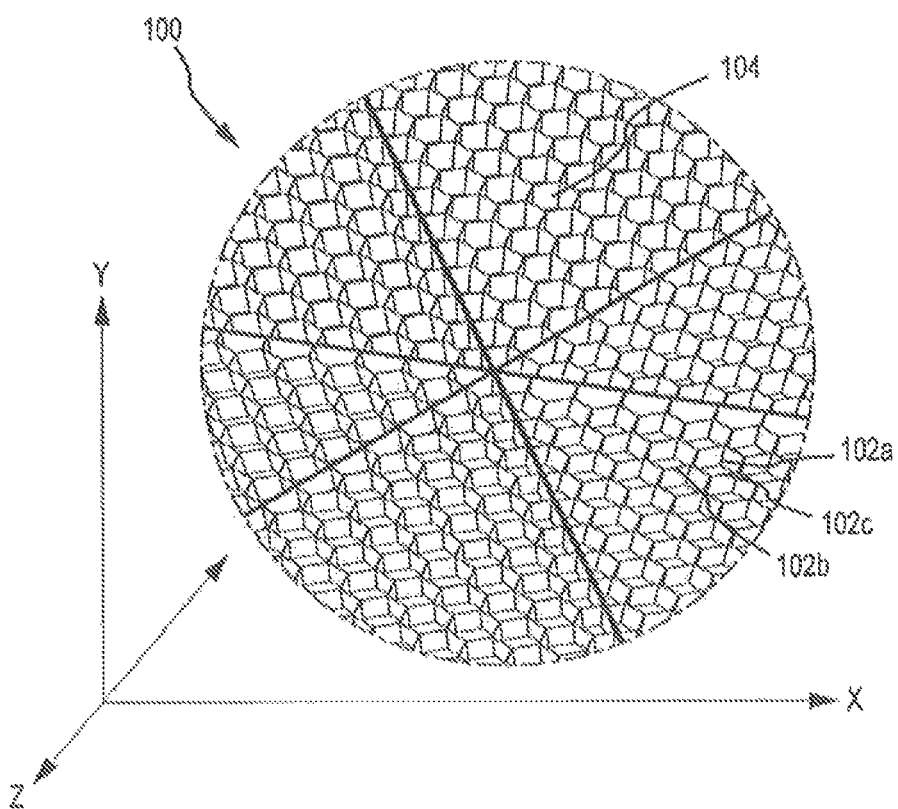
FIG. 1 illustrates, in accordance with various embodiments, a top perspective view of a noise suppressing structure.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact for similar phrases) may also include reduced contact or minimal contact.

As used herein, "aft" refers to the direction associated with the tall (e.g., the back end) of an aircraft, or generally, to the direction of exhaust of the gas turbine. As used herein, "forward" refers to the directed associated with the nose (e.g., the front end) of an aircraft, or generally, to the direction of flight or motion.

A as turbine engine may include noise suppressing structures. These structures may be comprised of a plurality cellular structures or cells. These cells may be arranged in a lattice, such as a lattice resembling a plurality of "honeycomb" shaped cells. Each cell may act in concert with one or more other cells as part of the larger noise suppressing structure to cancel or suppress noise generated by a gas turbine engine. Cells may be situated between a first layer of material and a second layer of material. Either layer of material may comprise a plurality of perforations through which a sound wave may enter. However, typically, only one of these layers includes perforations.

A sound wave may enter a noise suppressing structure through a perforated layer. As the sound wave enters the cell, the sound wave may travel through the depth of the cell and reflect from the non-perforated or "back" layer of the cell. This reflected wave may travel back through the depth of the cell (or "cell depth," as defined below) and exit the perforated layer out of phase (e.g., one quarter wavelength, one half wavelength, three quarters wavelength, and/or the like) with the sound wave entering the perforated layer. Thus, a sound wave entering the perforated layer may interfere with and more specifically, destructively interfere with (i.e., cancel or substantially cancel), a reflected and phase shifted sound wave exiting the perforated layer. Destructive interference may result in complete cancelation (i.e., two waves interfering to result in a wave having an amplitude of 0) and/or substantial cancelation (i.e., two waves interfering to result in a wave having an amplitude of near 0), among other modes of destructive interference.

As used herein, "cell depth" may refer to a length of a cell wall formed between the first layer of material and the second layer of material. Cell depth, then, typically depends upon the frequency of sound to be cancelled or suppressed. More particularly, a higher frequency sound wave may be suppressed by a noise suppressing structure having a first cell depth, while a lower frequency sound wave may be suppressed by a noise suppressing structure having a second, greater, cell depth (as a sound wave decreases in frequency, its wavelength increases). Noise suppressing structures are therefore generally designed with a particular engine type or size in mind, as the acoustic frequencies generated by an engine of a first type may be higher or lower than those generated by an engine of a second type.

In addition, noise suppressing structures are often incorporated variously throughout jet engine nacelles. A nacelle may comprise an inlet, a fan cowl, a thrust reverser, and In particular, one or more noise suppressing structures may be incorporated about an inner and/or outer surface of a wall of a nacelle. The cell depth associated with a particular noise suppressing structure may vary, however, depending upon a variety of engine design requirements, including, for example, the surface area and volume available about a particular nacelle wall. Thus, cell depth may be limited, and so too, the frequency range capable of suppression by a particular noise suppressing structure.

For example, as gas turbine engines have continued to grow larger and more powerful, the frequencies generated as a result of their operation have continued to decrease. Specifically, high bypass modern engines tend, in comparison to lower bypass legacy engines, to produce lower operational acoustic frequencies. As discussed previously, lower operational acoustic frequencies are associated with increased cell depth of noise suppressing structures. The space available about nacelle walls has not, however, increased to accommodate noise suppressing structures having greater cell depths. Indeed, many modern engines incorporate reduced or streamlined nacelle profiles. These streamlined profiles may limit the space available for incorporation of noise suppressing structures. Thus, streamlined nacelle profiles may limit modern jet engines, notwithstanding the need for greater cell depths, to noise suppressing structures having shallow (or shallower) cell depths. Thus, conventional noise suppressing structures may not suppress the lower acoustic frequencies generated by larger (more recent) jet engines, particularly as nacelle profiles are streamlined for aerodynamic improvement.

Therefore, in various embodiments, and with reference to FIG. 1, a noise suppressing structure 100 is shown. The noise suppressing structure 100 may, as described herein, be capable of suppressing low frequency sound, even as a cell depth associated with the noise suppressing structure 100 is reduced.

The noise suppressing structure 100 may, in various embodiments, comprise one or more cellular structures or cells, such as, for illustrative purposes, cells 102a, 102b, and 102c. These cells 102a, 102b, and 102c may be arranged in a lattice 104. Each cell 102a, 102b, and/or 102c may comprise a variety of cross-sectional profiles (e.g., hexagonal, octagonal, quadrilateral, triangular, circular, and the like). Thus, the lattice 104 may, in various embodiments, comprise a quadrilateral cylindrical structure such as a rectangular cylindrical structure, a square shaped cylindrical structure, and the like. The lattice 104 may also comprise, in various embodiments, a circular cylindrical structure, a triangular cylindrical structure, a hexagonal cylindrical structure or "honeycomb" shaped structure, and the like.

Figure 2:
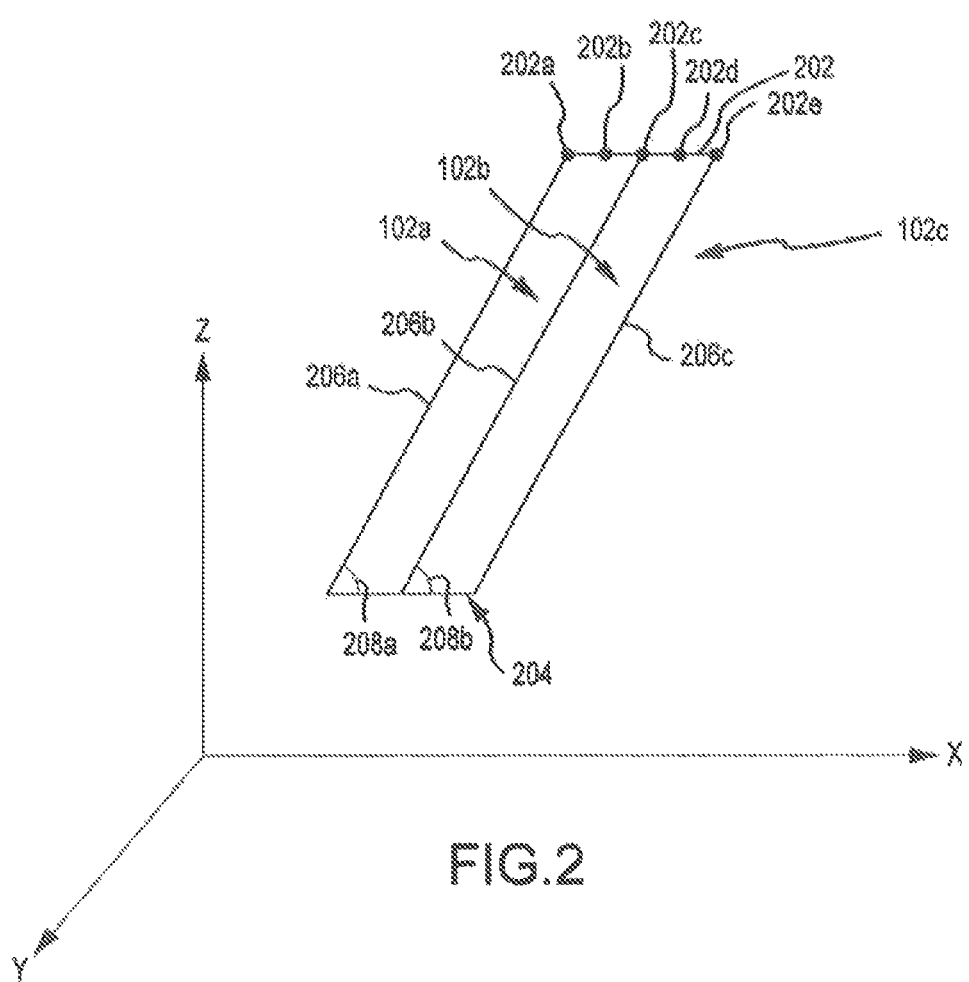
FIG. 2 illustrates, in accordance with various embodiments, a cross-sectional view of a plurality of noise suppressing cells.

As shown with reference to FIG. 2, each cell 102a, 102b, and 102c may be situated between and/or coupled to a first layer of material 202 and a second layer of material 204. In various embodiments, either of as first layer 202 and/or a second layer 204 may comprise any of a variety of thin films, septums, or "skins."

Either first layer of material 202 and/or second layer of material 204 may further comprise a plurality of perforations or holes through which a sound wave may enter. However, in various embodiments, only one of first layer of material 202 and second layer of material 204 includes perforations. Thus, as shown, in various embodiments, the first layer 202 may comprise one or more perforations, such as, perforations 202a, 202b, 202c, 202d, and/or 202e. Therefore, as used herein, the first layer 202 may be referred to as a "perforated layer" or "top layer." Likewise, the second layer of material 204 may be referred to herein as a "back layer."

In addition, as shown, each of the cells 102a, 102b. and 102c may be situated such that each of the cell walls, such as for example cell walls 206a, 206b, and/or 206c, forms an acute angle 208a and 208b with the first layer of material 202 and/or the and second layer of material 204. In various embodiments, an angle 208a and/or 208b may range from approximately 1 degree to 89 degrees from the horizontal. Further, in various embodiments, an angle 208a and/or 208b may range from 20 to 75 degrees from the horizontal. Thus, each cell wall 206a, 206b, and/or 206c may slant or lean with respect to the first layer of material 202 and/or the second layer of material 204 such that cells 102a, 102b, and 102c are non-orthogonal to first layer of material 202 and/or second layer of material 204. In this regard, the cells 102a, 102b, and 102c may be referred to as "slanted" or "slanting." The cells 102a, 102b, and 102c may also be referred to herein as "slant cores" or "slanted cores," as each cell 102a, 102b, and 102c may be regarded as a noise suppressing "core."

Figure 3A:
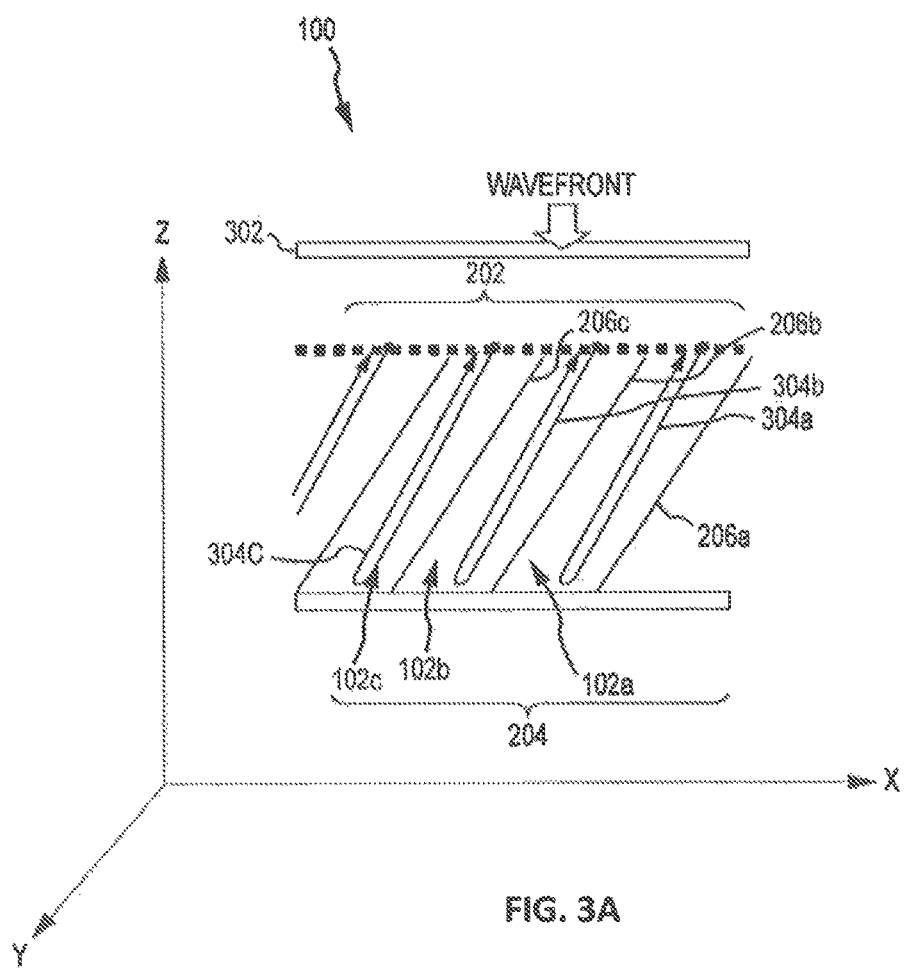
FIG. 3A illustrates, in accordance with various embodiments, a cross-sectional view of a plurality of noise suppressing cells reflecting a wave front.

In operation, as shown with respect to FIGS. 3A and 3B, a sound wave 302 may enter the cells 102a, 102b, and 102c of the suppressing structure 100 through perforations made in the first layer 202. As the sound wave 302 travels through each cell 102a, 102b, and 102c, the sound wave reflects from the second layer 204 to exit as it returns to the perforations made in the first layer 202. Thus, the phase shift occurs as the sound wave 302 reflects from the second layer 204, and the frequency shifted wave 302 may exit the first layer 202. In various embodiments, the reflected sound wave 302 may be shifted in phase by any suitable degree, such as by a quarter wavelength, a half wavelength, three quarters wavelength, and the like. Thus, as the sound wave 302 exits the first layer 202, the wave 302 may cancel with or substantially cancel with the portion of the sound wave 302 entering the first layer 202.

The distance 304a, 304b, and/or 304c that the sound wave 302 must travel through each cell 102a, 102b, and 102c is greater than, for example, the distance that the sound wave 302 would travel through a cell having walls orthogonal to (or situated at an angle slighter or less acute than angles 208a, 208b, and/or 208c) a first layer 202 and/or a second layer 204. More particularly, in comparison to a cell having walls orthogonal to a perforated layer and/or a non-perforated layer, the walls 206a, 206b, and 206c of cells 102a, 102b, and 102c may extend the distance that the sound wave 302 must travel through the cells 102a, 102b, and 102c, because, as can be seen, the walls 206a, 206b, and 206c may be viewed as hypotenuses of right triangles formed between each wall 206a, 206b, and 206c and each layer 202 and 204. In various embodiments, the length of walls 206a, 206b, and/or 206c may define a cell depth of a slanted cell or a "slanted cell depth." In various embodiments, slanted cell depths may range from 1.0 inches to 4.0 inches.

Thus, the cells 102a, 102b, and 102c may cancel or suppress a sound wave 302 having a lower frequency than cells having walls, for example, that are orthogonal to the first and/or second layers 202 and 204. In addition, the angles 208a, 208b, and 208c may be varied (increased or decreased) to adjust for a particular acoustic frequency. For example, the angles 208a, 208b, and 208c may be reduced to suppress increasingly lower acoustic frequencies. The cells 102a, 102b, and 102c may therefore successfully suppress low frequency sound generated by large jet engines, including jet engines utilizing large diameter turbofans.

With further regard to the described shift in wavelength, a sound wave 302 may enter a perforation in the first layer 202 and travel down a 102a, 102b, and 102c, such as a honeycomb channel. Each cell 102a, 102b, and 102c may form a Helmholtz resonator. The speed of the sound wave 302, thickness of first layer 202, and/or volume of the cell may contribute to the damping achieved. The pressure in the cell may change by the influx and efflux of air flow through a perforation and the thickness of the first layer. Sound wave 302 may react with a second layer 204 within the honeycomb channel and be reflected back towards the perforation. Sound wave 302 may exit the perforation.

The cell depth may be a quarter of the wavelength of the sound wave 302 the cell is tuned to cancel. Sound wave 302 may travel down the cell 102a, 102b, and 102c to the second layer 204 and be reflected back towards the first layer 202 by travelling half the wavelength and experience a 180 degree phase shift. This phase shifted sound wave 302 may interfere with an incoming sound wave 302 and destructively abate (i.e., destructively interfere with) the target sound wave 302.

With reference to FIG. 4A, a nacelle 400A may comprise a plurality of noise suppressing structures, such as for example, noise suppressing structures 100. As described herein, the noise suppressing structure 100 may include a plurality of cells such as slanted cells 102a, 102b, and 102c. In various embodiments, the noise suppressing structure 100 may be situated within a support structure comprising a plurality of support members (or "ribs"), such as for example, ribs 402a, 402b, 402c, and 402d. A rib 402a, 402b, 402c, and 402d may comprise any of a variety of suitable materials, including, for example, a woven and/or layered material, such as a woven and/or layered composite materials.

Figure 4B:
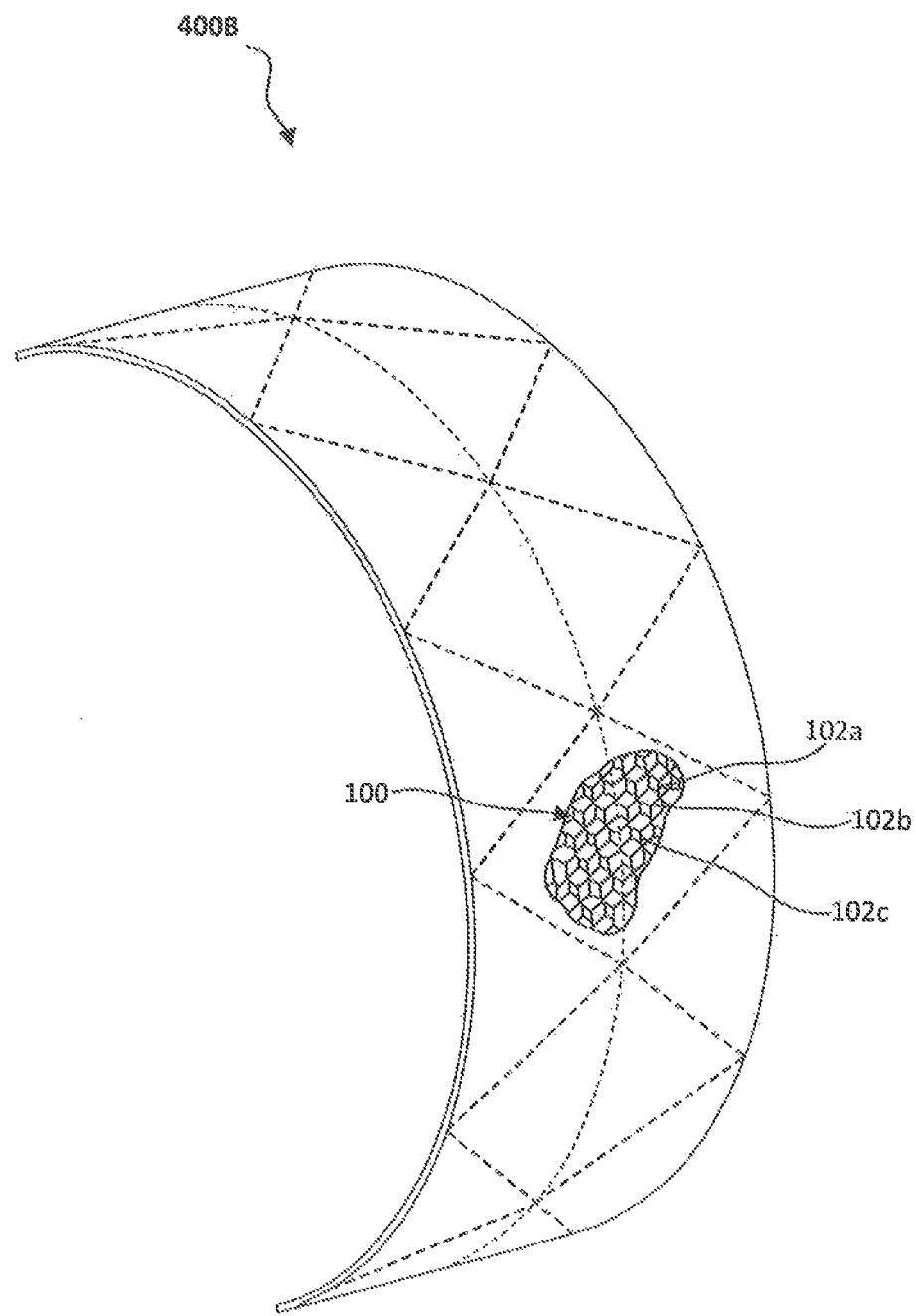
FIG. 4B illustrates, in accordance with various embodiments, a perspective view of a nacelle comprising a trilateral support structure.

The ribs 402a, 402b, 402c, and 402d may intersect, in various embodiments, to form any of a variety of geometries. For example, as shown at FIG. 4A, the support structure formed by the ribs 402a, 402b, 402c, and 402d may comprise a quadrilateral (e.g., rectangular) geometry. Similarly, as shown at FIG. 4B, a nacelle 400B may comprise or may include a support structure comprising a trilateral (e.g., triangular) geometry. Further, in various embodiments, a support structure (not shown) may comprise a hexagonal and/or octagonal geometry, such as an isostatic hexagonal geometry. In various embodiments, a support structure may comprise a combination of any of the foregoing geometries as well and/or any other suitable geometry.

A support structure may comprise a continuous or partially continuous structure, For example, in various embodiments, one or more ribs 402a, 402b, 402c, and 402d may not be joined or coupled to one or more other ribs 402a, 402b, 402c, and 402d. Rather, one or more ribs 402a, 402b, 402c, and 402d may be manufactured or constructed such that the one or more ribs 402a, 402b, 402c, and 402d are integrally formed with one or more other ribs 402a, 402b, 402c, and 402d, In addition, in various embodiments, one or more ribs 402a. 402b, 402c, and/or 402d may simply abut one or more other ribs 402a, 402b, 402c, and/or 402, wherein each rib 402a, 402b, 402c, and/or 402 is pressure fitted to an adjacent rib 402a, 402b, 402c, and/or 402.

Any number of the ribs 402a, 402b, 402c, and 402d may be coupled to or joined to the first layer 202 and/or the second layer 204. Further, in various embodiments, the ribs 402a, 402b, 402c, and/or 402 may not be mechanically (or otherwise) bonded to the first layer 202 and/or the second layer 204. The first layer 202 and/or the second layer 204 may, in various embodiments, enclose each of the ribs 402a, 402b, 402c, and/or 402, such that the ribs 402a, 402b, 402c, and/or 402 are held or secured within or between the first layer 204 and/or the second layer 204, notwithstanding the absence of a bond between the first layer 204 and/or the second layer 204 and the ribs 402a, 402b, 402c, and/or 402. The ribs 402a, 402b, 402c, and 402d may therefore define a load path between the first layer 202 and the second layer 204 and may serve to reinforce or support the slanted cells 102a, 102b, and 102c comprising the noise suppressing structure 100.

Figure 5:
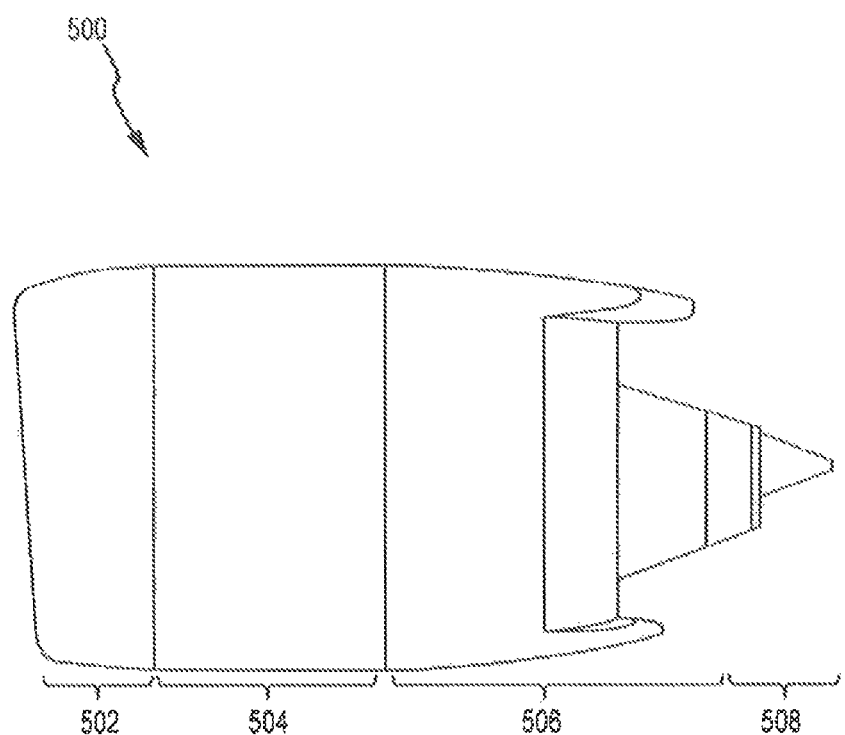
FIG. 5 illustrates, in accordance with various embodiments, a nacelle capable of including a plurality of noise suppression structures.

Accordingly, with respect to FIG. 5, a noise suppressing structure 100 may be incorporated in any suitable location in or near a jet engine and/or within or about a nacelle 500 of a jet engine. For example, a noise suppressing structure 100 may be incorporated within or about an inlet portion 502 of a nacelle 500. Likewise, a noise suppressing structure 100 may be incorporated within or about a fan cowl 504 of a nacelle 500, a thrust reverser portion 506 of a nacelle 500, and/or an exhaust portion 508 of a nacelle 500.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A noise suppressing structure comprising:
   a plurality of hollow noise suppressing cells separated by a plurality of cell walls situated between a perforated layer of material and a non-perforated layer of material; and
   a support structure comprising a plurality of support members, wherein the plurality of cell walls are situated within the support structure and wherein the plurality of support members of the support structure comprise a trilateral geometry,
   wherein the plurality of noise suppressing cell walls contact the perforated layer of material at an angle such that the plurality of noise suppressing cells are non-orthogonal to the perforated layer of material and the non-perforated layer of material, each hollow noise suppressing cell of the plurality of hollow noise suppressing cells comprising a slanted cell depth defined by the plurality of cell walls,
   wherein the perforated layer of material and the non-perforated layer of material are situated substantially parallel to each other,
   wherein the plurality of support members are disposed between the perforated layer of material and the non-perforated layer of material and are configured to reinforce the plurality of noise suppressing cells,
   wherein the slanted cell depth of each of the plurality of hollow noise suppressing cells is equal in order to suppress a single acoustic frequency.

2. The noise suppressing structure of claim 1, wherein each of the plurality of noise suppressing cells comprises a hexagonal cross-sectional profile.

3. The noise suppressing structure of claim 1, wherein each of the plurality of noise suppressing cells comprises one of: a quadrilateral cross-sectional profile, a triangular cross-sectional profile, an octagonal cross-sectional profile, or a circular cross-sectional profile.

4. The noise suppressing structure of claim 1, wherein the angle comprises an acute angle between twenty degrees and seventy-five degrees.

5. The noise suppressing structure of claim 1, wherein the noise suppressing structure is incorporated within a jet engine nacelle.

6. The noise suppressing structure of claim 1, wherein the slanted cell depth is in the range between one inch and three inches.

7. The noise suppressing structure of claim 1, wherein the support structure comprises a plurality of ribs disposed between the perforated layer of material and the non-perforated layer of material.

8. The noise suppressing structure of claim 7, wherein the plurality of ribs define a load path between the perforated layer of material and the non-perforated layer of material.

9. The noise suppressing structure of claim 1, wherein the plurality of noise suppressing cells are arranged in a first lattice and a second lattice, the plurality of ribs comprise a first plurality of ribs and a second plurality of ribs, and the first lattice is mechanically engaged by the first plurality of ribs and the second lattice is mechanically engaged by the second plurality of ribs.

10. The noise suppressing structure of claim 1, wherein the plurality of support members are integrally formed with each other.

11. The noise suppressing structure of claim 1, wherein the plurality of support members are disposed between the perforated layer of material and non-perforated layer of material notwithstanding the absence of a bond between the plurality of support members and the perforated layer of material and non-perforated layer of material.

12. The noise suppressing structure of claim 1, wherein the plurality of support members are pressure fitted together.

13. A nacelle for a jet engine comprising:
   a plurality of hollow noise suppressing cells separated by a plurality of cell walls situated within a support structure defined by a plurality of intersecting support members configured to reinforce the plurality of noise suppressing cells,
   wherein the plurality of intersecting support members define a load path between a perforated layer of material and a non-perforated layer of material and wherein the plurality of intersecting support members comprise a trilateral geometry,
   wherein the plurality of noise suppressing cell walls extend non-orthogonally to a perforated layer of material and define a slanted cell depth of each of the plurality of hollow noise suppressing cells,
   wherein the plurality of noise suppressing cells are situated between the perforated layer of material and a non-perforated layer of material,
   the perforated layer of material and the non-perforated layer of material are situated substantially parallel to each other, wherein the slanted cell depth of each of the plurality of noise suppressing cells is equal in order to suppress a single acoustic frequency.

14. The nacelle of claim 13, wherein the plurality of cell walls contact the perforated layer of material at an acute angle such that the plurality of noise suppressing cells are non-orthogonal to the perforated layer of material.

15. The nacelle of claim 13, wherein the slanted cell depth is in the range between one inch and three inches.

* * * * *